United States Patent [19]
Lebert

[11] 3,895,841
[45] July 22, 1975

[54] VACUUM ACTUATED VEHICLE SAFETY DEVICE

[76] Inventor: Herbert A. Lebert, 25 Windsor Dr., Hillsborough, Calif. 94010

[22] Filed: Sept. 3, 1974

[21] Appl. No.: 502,651

[52] U.S. Cl. .............. 297/384; 297/216; 297/453
[51] Int. Cl.² .................................. A62B 35/00
[58] Field of Search ...... 297/384, 216, 180, DIG. 3, 297/217, 463, 453; 280/150 B; 251/139, 140, 298, 249, 344, 343, 320, 321

[56] References Cited
UNITED STATES PATENTS

| | | | |
|---|---|---|---|
| 529,119 | 11/1894 | Frank | 251/321 |
| 3,014,226 | 12/1961 | Wilfert | 5/347 |
| 3,137,523 | 6/1964 | Karner | 297/180 |
| 3,240,510 | 3/1966 | Spouge | 297/388 X |
| 3,409,326 | 11/1968 | Kerner | 297/384 |
| 3,608,961 | 9/1971 | Von Heck | 297/DIG. 3 |
| 3,730,588 | 5/1973 | Braun | 297/384 |
| 3,770,318 | 11/1973 | Fenton | 297/180 |

FOREIGN PATENTS OR APPLICATIONS 1,258,697   3/1961   France ............................. 297/216

Primary Examiner—James T. McCall
Attorney, Agent, or Firm—Julian Caplan

[57] ABSTRACT

Vehicle seats are formed with a plurality of openings, each connected through a pressure-actuated valve to an impact actuated valve and thence to a vacuum tank. Upon a crash occurring, the impact-actuated valve is opened. Pressure of the body of the operator and passengers has caused opening of only those pressure-actuated valves with whose seat openings said bodies are in contact. The operator and passengers are held in their seats by atmospheric pressure and the absence of pressure (vacuum) in the portion of the seat with which the bodies are in contact. The vacuum tank may be pumped in various ways, as by a pump driven by the vehicle engine, by the vacuum in the intake manifold of the engine, etc. The impact-actuated valve may be opened by the inertia of a pendulum-like weight against a spring tending to seat the valve.

12 Claims, 8 Drawing Figures

VACUUM ACTUATED VEHICLE SAFETY DEVICE

This invention relates to a new and improved vacuum-actuated vehicle safety device. The invention is intended to replace or supplement seat belts. Essentially the device holds the body of the passenger and driver against the seat back cushion and the seat bottom cushion by atmospheric pressure.

In the event that the present invention eliminates seat belts, certain advantages accrue. In the first place, fastening the seat belts requires attention of the driver or passenger, whereas the present invention operates without any attention. Secondly, certain dangers of injury, particularly to small children, occur when seat belts are applied by reason of the belt cutting into the seat occupant. Further, seat belts are sometimes a source of danger in that they must be unlatched in order for the passenger to escape from the vehicle after a crash. All of these disadvantages are overcome by the present invention.

It has also been suggested that certain impact-actuated air bags be located in the atuomobile so that upon a crash the air bags are inflated and are interposed between the passenger or driver and the dashboard. Such bags, at least momentarily, block vision, whereas in accordance with the present invention there is no blockage of vision.

A feature of the invention is the fact that an impact from any direction will actuate the device as contrasted with other types of safety devices which resist impacts only from front and rear.

Another feature of the invention is the fact that although an imperfect seal is created between the body of the driver or passenger and the seat by reason of the passenger's clothing, nevertheless, such seal is sufficient to hold the occupant in place despite considerable impact.

Another feature of the invention is the fact that only those areas of the seat are open to vacuum where the pressure of the passenger's body is applied. The remaining areas of the seat are not subjected to vacuum. Hence the vacuum is concentrated where it is required.

Another feature of the invention is the simplicity of construction of the device and the relatively low cost thereof.

In aircarft use, two inertia valves may be used disposed 90° apart so that the vacuum is applied either to prevent injury from impact on the ground or turbulence. For use against air turbulence, instead of a vacuum tank being used, communication with the reduced pressure outside the cabin may be controlled by the second inertia valve.

Other objects of the present invention will become apparent upon reading the following specification and referring to the accompanying drawings in which similar characters of reference represent corresponding parts in each of the several views.

IN THE DRAWINGS

Figure 1:
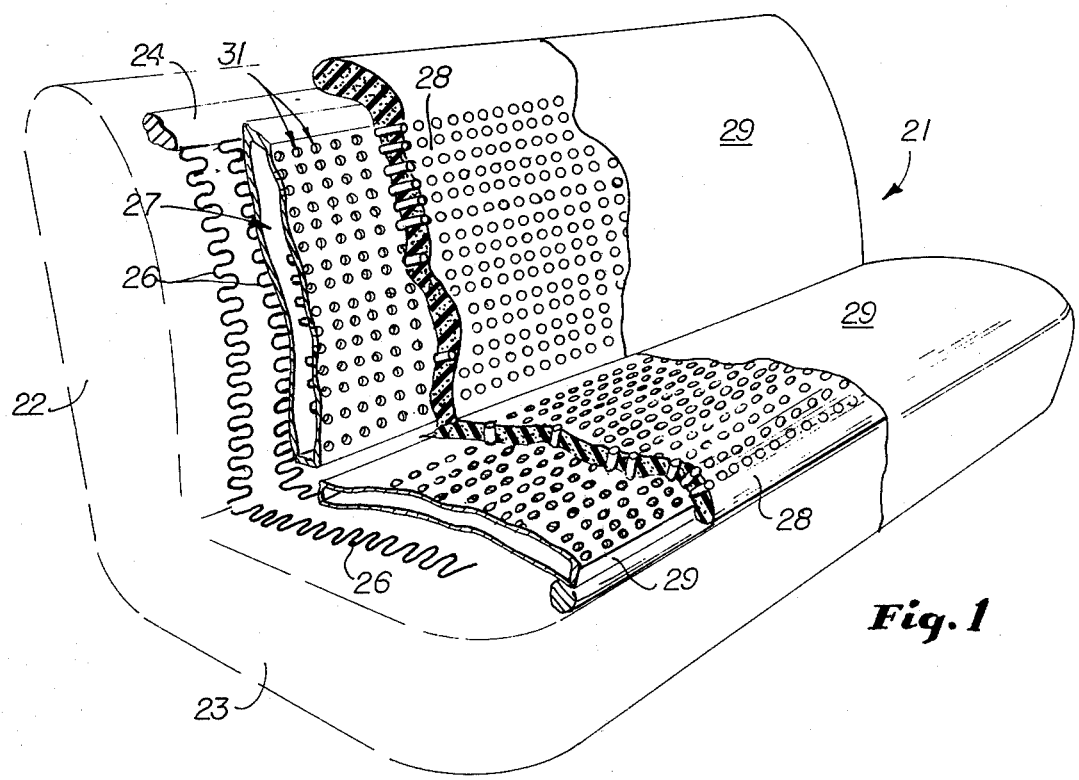
FIG. 1 is a persepctive view partly broken away in sections to reveal internal construction showing the invention installed in a conventional automobile seat.
Figure 2:
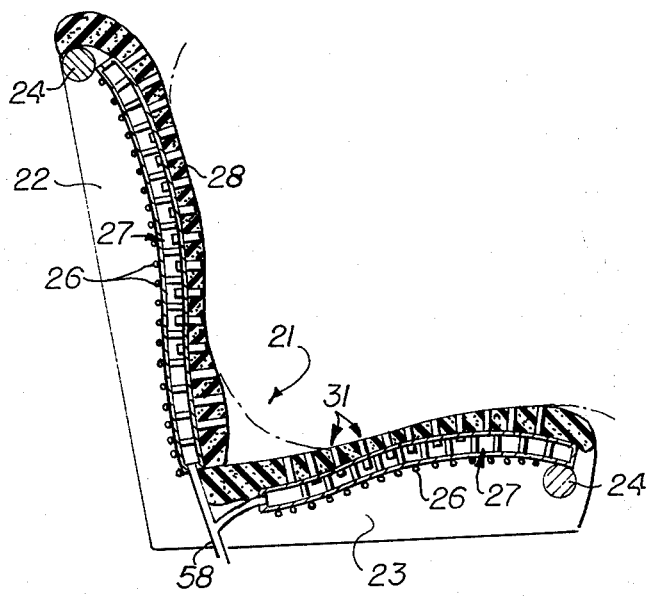
FIG. 2 is a vertical sectional view through the structure of FIG. 1.

In accordance with the present invention, a vacuum tank 11 is installed in an appropriate location in the vehicle. The vacuum is created by pump 12 connected with tank 11 by check valve 13. Pump 12 may be actuated in various ways as by being driven from the engine of the vehicle, or by the vehicle's electrical system, or it may be replaced by a connection to the intake manifold of the engine. Piping 14 connects tank 11 to impact-actuated valve 16, hereinafter described in detail. Valve 16 is opened upon a crash occurring, and one of the features of the valve 16 is that impact received from any direction opens the valve. In the case of an airplane installation there would be two inertia valves 16, 16a, set at 90° to each other. One to take horizontal impact from any direction. The other to take vertical, i.e., up and down impact as in CAT (clear air turbulence). If desired, for CAT operation, no vacuum tank, pump, etc. are needed as the pressure differential between the pressurized cabin and the reduced (due to altitude) outside or atmospheric can be utilized with the discharge from the vacuum compartments in the seat being piped overboard when the inertia valve is actuated. The horizontal action, i.e., any impact on the ground or with the cabin in non-pressurized state, would still require a vacuum tank and connections.

As illustrated herein, a vehicle seat 21 is formed having a seat back 22 and a seat bottom 23 mounted on a frame 24. It will be understood that the structure of vehicle seats is subject to wide variation, but the present invention is applicable to all known vehicle seats.

Figure 3:
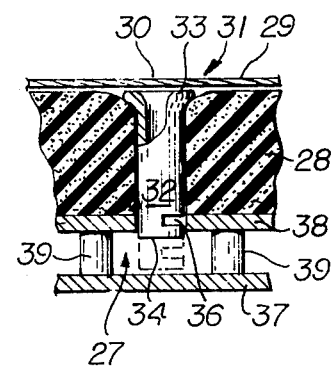
FIG. 3 is an enlarged sectional view through one form of pressure-actuated valve.
Figure 6:
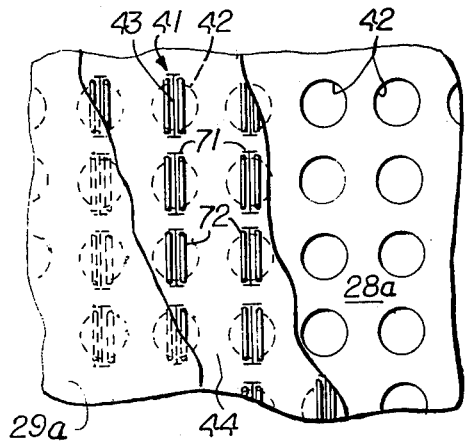
FIG. 6 is a top plan, partly broken away to reveal internal construction of the structure of FIG. 5.
Figure 5:
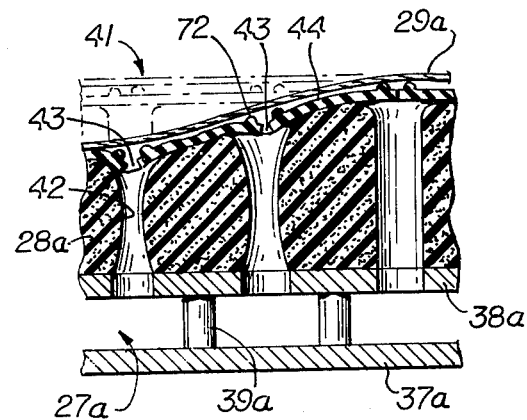
FIG. 5 is a fragmentary sectional view of an optional pressure-actuated valve.
Figure 7:
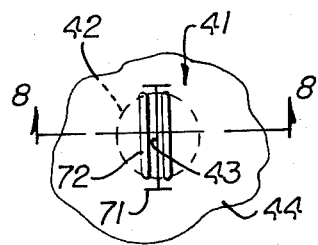
FIG. 7 is an enlarged fragmentary plan view of a portion of FIG. 6.
Figure 8:
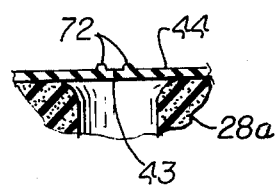
FIG. 8 is a sectional view taken substantially along line 8—8 of FIG. 7 showing the valve in closed position.

Springs 26 or webbing (not shown) are attached to the frame 24 and support vacuum compartment 27 (hereinafter described in detail) which is sufficiently flexible to accommodate the shape of the driver or passenger seated thereon. Foam cushion material 28 is placed over the vacuum compartment 27 and covered by upholstery 29 formed with openings 30 above each of the pressure-actuated valves 31 installed in cushion 28. As shown in FIG. 3, each valve 31 has a tube 32 having a flange 33 on its exterior bearing against the cushion 28. The inner end 34 of tube 32 is plugged and is formed with a port opening 36 which, in the form shown in FIG. 3, is merely a slot in the wall of tube 32. In the closed position of the valve shown in FIG. 3, the slot 36 is closed by front 38 from the vacuum in compartment 27. When downward pressure is applied to the flange 33 by pressure of the seat occupant thereagainst, cushion 28 is compressed and the tube 32 moves from solid line position to dotted line position shown in FIG. 3, whereupon the slot 36 is in communication with vacuum compartment 27 and a vacuum is drawn through the opening 30. Thus, the seat occupant's body is subjected to vacuum through openings 30 with which the body is in contact. Those valves 31 which are not subject to the pressure of the body of the occupant are not opened and hence the vacuum in compartment 27 is not needlessly dissipated. In the preferred form of compartment 27 shown in FIG. 3, there is a backing 37 and a front 38 spaced apart by spacers 39, it being understood that it is desirable that front 38 be flexible enough to conform to the body of the occupant of the seat but that the compartment not collapse under either the vacuum applied thereto or the weight of the occupant's body. The attachment of compartment 27 to springs 26 allows some "give" so that energy or force of impact is absorbed but the occupant does not come into contact with the dashboard or windshield.

The average occupant makes contact with back 22 and bottom 23 over an area sufficient so that the holding power of the present device is 20 G (20 times occupant's weight at sea level). Since the vacuum action is required only for a very short time and the seal of the occupant's clothing aginst covering 29 is good enough to hold for several seconds, the device works under severe impact stresses.

Figure 4:
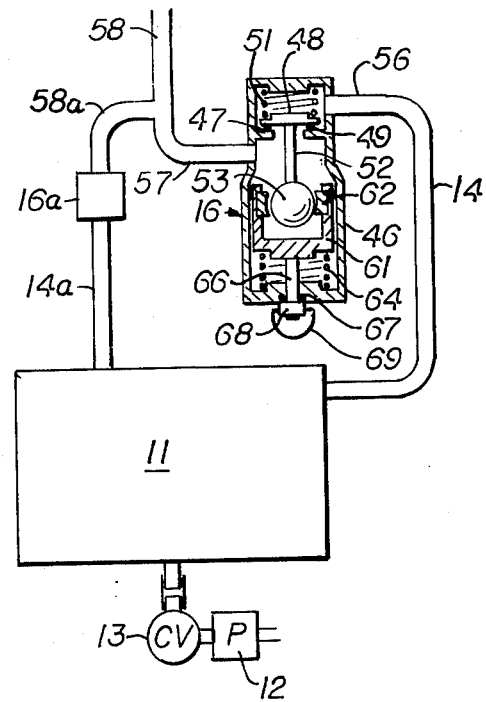
FIG. 4 is a schematic view showing the relation of the impact valve and the vacuum tank.

In the form of the invention shown in FIGS. 5–8 each valve 41 is at the exterior of one of a plurality of cavities 42 formed in cushion 28a. Preferably the walls of cavity 42 are formed air-tight so that the air pockets in the sponge rubber cushion 28a need not be evacuated. Overlying cushion 28a is an airtight, flexible skin 44 formed with normally closed slits 43 overlying cavities 42 and overlying skin 44 is upholstery 29a. In a preferred form, there are short cuts 71 extending in either direction perpendicular to the ends of slits 43 to provide greater valve flexibility. Further, ridges 72 are formed on the outside surface of skin 44 extending parallel to and on either side of slits 43 and terminating a short distance from cuts 71. The pressure of the occupant of seat 21 on ridges 72 forces open slits 43 by distorting skin 44 in those locations where the body of the occupant is in contact with upholstery 29a. In other repects the modification of FIGS. 5–6 resembles that of the preceding modification and the same reference numerals followed by subscript $a$ are used to designate corresponding elements. A preferred form of impact valve 16 is shown in FIG. 4. Valve body 46 has an internal flange 47 forming the seat for valve disc 48 with a seal 49, such as an O-ring, interposed. Valve spring 51 bears against disc 48, its upper end bearing against the top of body 46. Below disc 48 is an arm 52 having a weight 53 at its lower end. Above flange 47 is a port 46 leading to tank 11 through tubing 14. Below flange 47 is port 57 connected by tubing 58 to vacuum compartments 27. Upon impact, the weight 53 is swung in a direction toward the point of impact and this causes the disc 48 to tilt relative to seat 47, opening communication between ports 56 and 57. So that the unseating of the disc 48 is of sufficient duration, an annular magnet 62 is located surrounding but normally spaced from weight 53. When the weight 53 is driven out of vertical position, it engages magnet 62 and this holds valve 16 open. Piston 61 is normally held in its elevated position shown in FIG. 4 by spring 64 which bears against the bottom of body 46.

To reset disc 48 in closed position, piston 61 is provided with a stem 66 which extends through the bottom of body 46 and is sealed by means of seal 67. Exteriorly of body 46 is a nut 68 which adjusts the position of magnet 62 and preferably pull ring 69 is connected to nut 68. By pulling ring 69 downward, the magnet 62 is pulled out of proximity to weight 53 and the weight is restored to central position with the disc 48 firmly seated on flange 47. When the ring 69 is released, the spring 64 returns the magnet 62 to normal position. It will be understood that ring 69 may be actuated in different ways, as by a solenoid (not shown), energized by a button on the instrument panel, or the like.

Suitable gauges and/or lights (not shown) to indicate that a proper vacuum exists and that the system is ready to function may be installed.

What is claimed is:

1. A device to momentarily hold an occupant in a vehicle seat against impact-created forces tending to impel the occupant out of his seat, comprising a seat cushion having an air-pervious outer covering, first means in said cushion having a cavity, a plurality of passages throughout said cushion, each leading from said cavity to a discrete area of said covering, a first valve in each said passage, each said first valve having valve opening means shaped to be individually contacted by the body of said occupant and responsive to the pressure of the occupant against said valve opening means, said valve opening means opening communication through the particular first valve with which it is associated through one said passage to said cavity only when a portion of the body of the occupant rests on said valve opening means, said cavity having a normal pressure state and an emergency vacuum state, said first means when in vacuum state pulling air through only those first valves which are open to create a subatmospheric pressure between the occupant and said cushion tending to force the occupant toward said cushion, a source of vacuum, a conduit between said source and said cavity, and a normally-closed impact second valve in said conduit, said second valve having second means therein responsive to impact against the vehicle in which the seat is installed to open said valve, whereby said cavity is changed from pressure state to vacuum state.

2. An impact valve for use in a vehicle safety device comprising a body formed with a valve seat, a first port and a second port, one said port on each side of said seat, a valve disk in said body, first means biasing said disk against said seat to close off communication between said ports, a pendulum, second means connecting said pendulum to said disk, said pendulum having a normal position and a displaced position, whereby pre-determined severe impact imparted to said pendulum moves said pendulum to displaced position and raises at least a portion of said disk from said seat to establish communication between said ports, third means in proximity to said pendulum to hold said pendulum in displaced position until restored to normal position, and reset fourth means to restore said pendulum to normal position, said third means comprising an annular member surrounding said pendulum when in normal position, said pendulum and annular member being magnetizable and one of said last two mentioned elements comprising a magnet.

3. A device according to claim 1 in which said first means comprises a vacuum compartment and cushion material between said compartment and said covering, plurality of passages dispersed throughout said cushion, each leading from said compartment to a discrete area of said covering, said compartment formed with said cavity.

4. A device according to claim 1 which further comprises a sheet of air-impervious skin between said cushion material and said covering and overlying said passages, said first valve comprising a slit in said skin over the distal end of said passage, said slit being normally closed under action of either vacuum or atmospheric pressure; said skin around said slit deforming to open said slit when a portion of the body of said occupant rests on the covering vicinal said slit.

5. A device according to claim 1 in which said second valve comprises a tube slidable in said passage having a closed first end adjacent said compartment and an open first end adjacent said covering, said tube being formed with an aperture spaced from said first end, said aperture being normally out of communication with said compartment, the portion of the body of said occupant resting on the covering vicinal said second valve pushing said first end of said tube into said compartment to establish communication between said compartment, said aperture, said tube and said second end.

6. A device according to claim 2 which further comprises a seat frame, springs on said frame, said compartment fitting against said springs, said compartment being flexible to flex to accommodate the shape of the occupant resting on said seat.

7. A device according to claim 1 in which said second valve comprises a body formed with a valve seat, a first port and a second port, one said port on each side of said seat, one said port connected to said source of vacuum and the other said port connected to said cavity, a valve disk in said body, third means biasing said disk against said seat to close off communication between said ports, a pendulum, fourth means connecting said pendulum to said disk, said pendulum having a normal position and a displaced position, whereby predetermined severe impact imparted to said pendulum moves said pendulum to displaced position and raises at least a portion of said disk from said seat to establish communication between said ports.

8. A device according to claim 7 which further comprises fifth means in proximity to said pendulum to hold said pendulum in displaced position until restored to normal position and reset sixth means to restore said pendulum to normal position.

9. A device according to claim 8 in which said fifth means comprises an annular member surrounding said pendulum when in normal position, said pendulum and annular member being magnetizable and one of said last two mentioned elements comprising a magnet.

10. A device according to claim 9 in which said reset sixth means comprises means for moving said annular member out of proximity to said pendulum.

11. A device according to claim 2 in which said compartment comprises a back, a front, spacers holding said back and front apart and means sealing around the perimeters of said back and front.

12. A device according to claim 2 in which said reset fourth means comprises means for moving said annular member out of proximity to said pendulum.

* * * * *